US012610967B2

(12) United States Patent
Kocjancic

(10) Patent No.: US 12,610,967 B2
(45) Date of Patent: Apr. 28, 2026

(54) VENDING MACHINE FOR ICE-CREAM AND THE LIKE AND OPERATING METHOD THEREOF

(71) Applicant: OMNIAMAC D.O.O., Volcja Draga (SI)

(72) Inventor: David Kocjancic, Volcja Draga (SI)

(73) Assignee: OMNIAMAC D.O.O., Volcja Draga (SI)

( * ) Notice: Subject to any disclaimer, the term of this patent is extended or adjusted under 35 U.S.C. 154(b) by 133 days.

(21) Appl. No.: 18/516,030

(22) Filed: Nov. 21, 2023

(65) Prior Publication Data

US 2024/0164403 A1 May 23, 2024

(30) Foreign Application Priority Data

Nov. 22, 2022 (IT) ........................ 102022000023988

(51) Int. Cl.
*A23G 9/22* (2006.01)
*A23G 9/08* (2006.01)
*A23G 9/28* (2006.01)

(52) U.S. Cl.
CPC .............. *A23G 9/228* (2013.01); *A23G 9/08* (2013.01); *A23G 9/281* (2013.01)

(58) Field of Classification Search
CPC ........... A23G 9/228; A23G 9/08; A23G 9/281
USPC .......................................... 141/11
See application file for complete search history.

(56) References Cited

U.S. PATENT DOCUMENTS

| 4,860,550 A | * | 8/1989 | Aoki | ...................... | A23G 9/163 |
| | | | | | 62/135 |
| 5,025,840 A | | 6/1991 | Tacke | | |
| 6,213,174 B1 | * | 4/2001 | Cook | ..................... | G01G 13/06 |
| | | | | | 141/83 |

(Continued)

FOREIGN PATENT DOCUMENTS

| EP | 0330252 A1 | 8/1989 |
| GB | 911724 A | 11/1962 |

(Continued)

OTHER PUBLICATIONS

JP 6462171 B1—English Translation (Year: 2019).*
Italian Search Report and Written Opinion dated May 17, 2023 for Italian Application No. 202200023988.

*Primary Examiner* — Christopher M Afful
(74) *Attorney, Agent, or Firm* — McCarter & English, LLP

(57) ABSTRACT

A vending machine for ice-cream and the like comprising: a batch-freezing unit that is capable of producing, inside itself, soft ice-cream and is provided with a valve assembly with a controlled opening and closing, through which the soft ice-cream can selectively flow out of the batch-freezing unit; a vessel-holding structure, which is adapted to temporarily support a portion vessel, placing it immediately beneath the valve assembly so as to collect the soft ice-cream that flows out of, and falls from, the valve assembly; and an electronic control device adapted to control at least said valve assembly; and a first detection device adapted to determine when the soft ice-cream coming out of the valve assembly touches the portion vessel stationary beneath the valve assembly; the electronic control device being adapted to control said valve assembly based on the signals coming from said first detection device.

19 Claims, 5 Drawing Sheets

(56) References Cited

U.S. PATENT DOCUMENTS

| | | | |
|---|---|---|---|
| 2015/0216201 A1* | 8/2015 | Bruckner | ................ G07F 13/06 |
| | | | 700/233 |
| 2019/0272699 A1 | 9/2019 | Mohammed et al. | |
| 2021/0059275 A1* | 3/2021 | Gerber | .................. G01G 19/52 |

FOREIGN PATENT DOCUMENTS

| | | | |
|---|---|---|---|
| JP | 6462171 B1 * | 1/2019 | |
| WO | WO 2014/104458 A1 | 7/2014 | |

* cited by examiner

VENDING MACHINE FOR ICE-CREAM AND THE LIKE AND OPERATING METHOD THEREOF

CROSS-REFERENCE TO RELATED APPLICATIONS

This patent application claims priority from Italian patent application no. 102022000023988 filed on Nov. 22, 2022, the entire disclosure of which is incorporated herein by reference.

TECHNICAL FIELD

The invention relates to a vending machine for ice-cream and the like and to an operating method thereof.

More in detail, the invention relates to a vending machine for soft ice-cream and to an operating method thereof. Uses to which the description below will make explicit reference without thereby losing generality.

STATE OF THE ART

As it is known, differently from artisan ice-cream, soft ice-cream is produced in real time right when it is sold, starting from a high-viscosity, liquid semi-finished product.

Most recent machines for the production of soft ice-cream comprise: a closed and substantially cylindrical-shaped, refrigerated batch-freezing container which is continuously maintained at a temperature below −5° C. and is provided, at an end, with a manually operated tapping valve; a rotary mixing member with substantially helical structure, which is accommodated in axially rotatable manner into the refrigerated container and is driven into rotation by an external electric motor, so as to thicken and push the semi-finished product present in the refrigerated container towards the tapping valve; a refrigerator compartment, which is adapted to accommodate, on the inside, one or more vessels containing the semi-finished product needed to produce the soft ice-cream and is capable of continuously maintaining said vessels at a preservation temperature slightly below +4° C.; and an electrically-operated feeding line, which is capable of pumping, on command, the semi-finished product from the vessel or vessels present inside the refrigerator compartment up to the batch-freezing container, so as to maintain substantially constant the amount of semi-finished product present inside the container.

The operation of these machines for production of soft ice-cream requires the person to place a disposable cup or cone beneath the nozzle of the tapping valve and, then, to manually open and close the tapping valve so that the desired quantity of soft ice-cream falls by gravity into the cup or cone.

In the past, some manufacturers of ice-cream production machines tried to produce vending machines for soft ice-cream, in which the tapping valve is opened and closed by an electromechanical actuator controlled by an electronic control unit.

Unfortunately, soft ice-cream vending machine never made it to the market because of the significant difficulties that affected the control of the tapping valve. As a matter of fact, the simple timed opening of the tapping valve does not allow soft ice-cream to be measured out with a precision and a reliability that can be constant in time.

Indeed, experimental tests have shown that the flowrate and the speed with which soft ice-cream falls from the dispensing nozzle can change over time in relatively unforeseeable manner and the range of the variations can be significantly wide, with the measuring errors that this entails.

The flowrate and falling speed of the soft ice-cream, in fact, mostly depend on density, viscosity and consistency of the soft ice-cream when it is dispensed. These are all quantities that, unfortunately, change to a very great extent based on the features of the semi-finished product used to produce the soft ice-cream, on the duration of the thickening process and/or on the ambient conditions (for example, temperature and humidity) in the nearby of the dispensing nozzle.

SUMMARY OF THE INVENTION

An aim of the invention is to improve the tapping-valve control algorithm so as to overcome the drawbacks described above.

In accordance with this aim, according to the present invention there is provided a vending machine for ice-cream and the like, the vending machine including a batch-freezing unit that is capable of producing, inside itself, soft ice-cream and is provided with a valve assembly with a controlled opening and closing, through which the soft ice-cream can selectively flow out of the batch-freezing unit; a vessel-holding structure, which is adapted to temporarily support a portion vessel, arranging said portion vessel immediately beneath the valve assembly so as to collect the soft ice-cream that flows out of, and falls from, the same valve assembly; and an electronic control device adapted to control at least said valve assembly. The vending machine for ice-cream and the like is generally characterized by additionally including a first detection device adapted to determine when the soft ice-cream coming out of the valve assembly touches the portion vessel stationary beneath the same valve assembly; and in that the electronic control device is adapted to command said valve assembly based on the signals coming from said first detection device.

Moreover according to the present invention there is provided an operating method of a vending machine for ice-cream and the like that includes a batch-freezing unit that is adapted to internally produce the soft ice-cream and is provided with a valve assembly with controlled opening and closing, through which the soft ice-cream can selectively flow out of the batch-freezing unit; and a vessel-holding structure, which is adapted to temporarily support a portion vessel, arranging said portion vessel beneath the valve assembly so as to collect the soft ice-cream that flows out of, and falls from, the same valve assembly; wherein the operating method generally includes the steps of: placing an empty portion vessel beneath the valve assembly; and then filling the portion vessel with the predetermined amount of soft ice-cream. The operating method is further generally characterized in that the filling of the portion vessel includes the steps of: (i) placing the portion vessel beneath the valve assembly, at a predetermined distance (do) from the latter; (ii) opening the valve assembly so as to cause the soft ice-cream to fall into the portion vessel beneath; (iii) determining the time taken by the soft ice-cream coming out of the valve assembly to reach the portion vessel beneath; (iv) calculating the total time to open the valve assembly based on the time taken by the soft ice-cream to reach the portion vessel; and (v) closing the valve assembly when the total opening time of the valve assembly previously calculated has elapsed.

In addition, according to the present invention, there is furthermore provided a method for pouring a semi-solid foodstuff with a creamy consistency.

BRIEF DESCRIPTION OF THE DRAWINGS

The invention will now be described with reference to the accompanying drawings showing a non-limiting embodiment thereof, wherein:

FIG. 4 is an enlarged perspective view of some components present inside the vending machine shown in FIGS. 1 and 2, with parts removed for clarity's sake; whereas

DETAILED DESCRIPTION OF THE EMBODIMENTS

Figure 1:
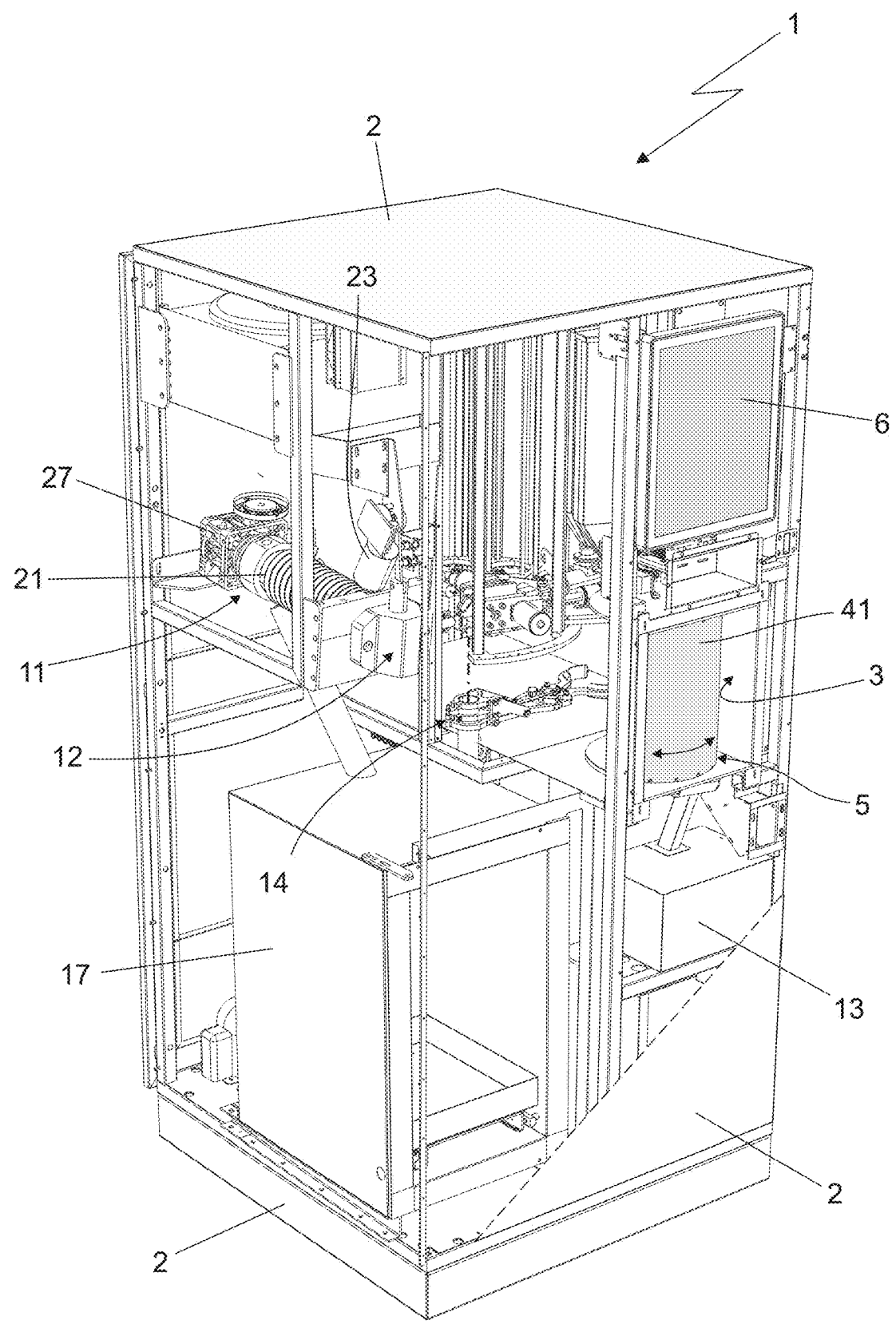
FIG. 1 is a perspective view of a vending machine for ice-cream and the like realized according to teachings of the present invention, with parts in section and parts removed for clarity's sake.
Figure 2:
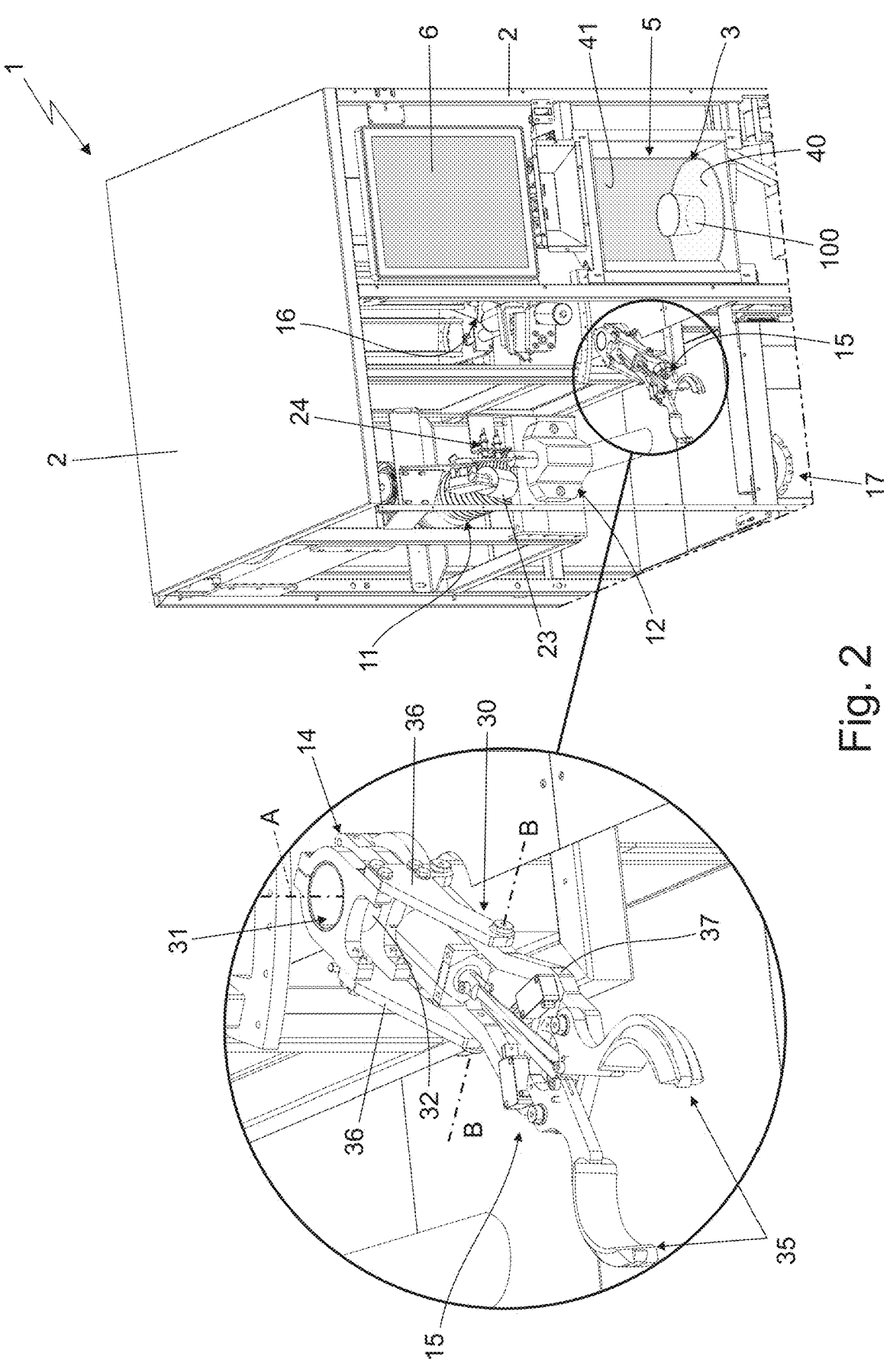
FIG. 2 is a view of the upper part of the vending machine shown in FIG. 1, with parts removed for clarity's sake.

With reference to FIGS. 1 and 2, number 1 denotes, as a whole, a vending machine that is particularly adapted to dispense, in a completely automatic manner, soft ice-cream into cones, cups and/or other similar disposable vessels.

More in detail, the vending machine 1 is adapted to produce the requested quantity of soft ice-cream basically in real time, when it has to be delivered to a customer, preferably starting from a high-viscosity, known liquid semi-finished product, and it is preferably adapted to deliver the soft ice-cream to the customer/user inside a cup 100, advantageously truncated-cone in shape or other similar disposable vessel.

The vending machine 1 firstly comprises a box-like outer casing 2 with a rigid and self-bearing structure, preferably substantially parallelepiped-shaped, which is adapted to be stably rest on and, optionally, also firmly anchored to the ground. In addition, the box-like casing 2 is preferably provided with a delivery compartment 3, which is dimensioned so as to accommodate, inside itself, a cup 100 containing the given amount of soft ice-cream or the like and which is directly reachable from the outside through an access opening specifically realized on a face of the box-like casing 2.

More in detail, the delivery compartment 3 is preferably dimensioned so as to accommodate, on the inside, one single cup 100 containing the predetermined amount of soft ice-cream or the like. Furthermore, the delivery compartment 3 preferably communicates with the outside through a large opening advantageously rectangular in shape, which is preferably located on the front face of the box-like casing 2 and is dimensioned to allow a person's hand to access the delivery compartment 3 in order to temporarily place a cup 100 in the delivery compartment 3 and/or grab and retrieve the cup 100 momentarily located in the same delivery compartment 3.

In the example shown, in particular, the box-like casing 2 preferably consists of a rigid inner supporting framework, preferably with a cage-like structure, which is made of metal material and is structured to stably rest on and, optionally, also be firmly anchored to the ground; and of a series of outer curtain panels, preferably made of metal material, which are firmly fixed to the supporting framework preferably in a removable manner, so as to cover the same framework.

With reference to FIGS. 1 and 2, in addition, the vending machine 1 is preferably also provided with a preferably electrically-operated, closing device 5 that is located at the access opening to the delivery compartment 3 and is adapted to selectively close/obstruct the access opening.

More in detail, the closing device 5 is movable, preferably on command, between a first and a second operating position. In the first operating position, the closing device 5 obstructs the access opening to the delivery compartment 3, so as to prevent a user's hand from accessing the delivery compartment 3. In the second operating position, on the other hand, the closing device 5 does not engage/obstruct the access opening to the delivery compartment 3, so as to allow a user's hand to easily access the delivery compartment 3 in order to temporarily place a cup 100 in the delivery compartment 3 and/or reach and retrieve the cup 100 located therein.

Moreover, the vending machine 1 is preferably provided with a control panel 6, which is located or surfaces on the outside of the box-like casing 2, preferably on the front face thereof, and is structured/configured to allow a person to manually select the desired type of soft ice-cream among the ones that can be dispensed by the vending machine 1 and/or to manually select the desired quantity of soft ice-cream among the ones than can be delivered by the vending machine 1.

Figure 3:
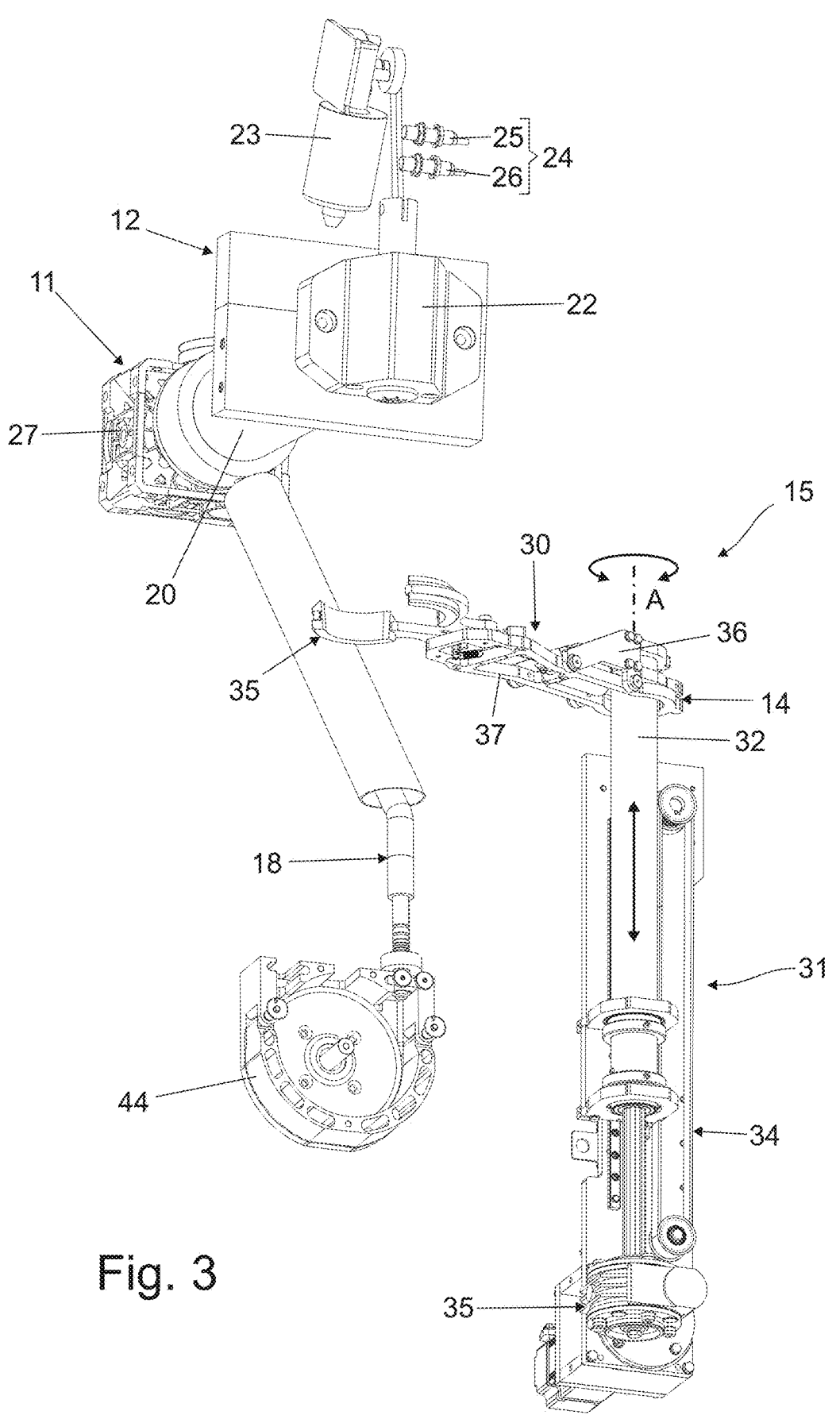
FIG. 3 is an enlarged perspective view of some components present inside the vending machine shown in FIGS. 1 and 2, with parts removed for clarity's sake.

With reference to FIGS. 1, 2 and 3, inside the box-like casing 2, the vending machine 1 moreover comprises: a preferably electrically-operated, batch-freezing unit 11 which is capable of producing, inside itself, the soft ice-cream and is provided with a valve assembly 12 with a controlled opening and closing, through which the soft ice-cream can selectively flow out of the batch-freezing unit 11; a vessel-holding structure, which is adapted to temporarily support a cup 100 or other disposable vessel, arranging said cup 100 or other disposable vessel immediately beneath the valve assembly 12 of the batch-freezing unit 11, so that it receives the soft ice-cream that flows out and falls from the valve assembly 12; and an electronic control device 13 that commands the valve assembly 12 of the batch-freezing unit 11.

More in detail, the electronic control device 13 is adapted to open and close the vale assembly 12 of batch-freezing unit 11 when an empty cup 100 or other disposable vessel is placed on the vessel-holding structure, beneath the valve assembly 12.

Moreover, the vessel-holding structure is preferably capable, on command, of vertically moving the cup 100 or other disposable vessel beneath the valve assembly 12, so as to vary the distance between the valve assembly 12 and the cup 100 or other disposable vessel temporarily located beneath the valve assembly 12.

The electronic control unit 13, in turn, is preferably adapted to also control the movement of the vessel-holding structure from and to the valve assembly 12.

Clearly, in a different embodiment, it could be the valve assembly 12 that vertically moves above the vessel-holding structure, so as to change the distance between the valve assembly 12 and the cup 100 or other disposable vessel temporarily located beneath the valve assembly 12.

In other words, the vessel-holding structure and the valve assembly 12 are vertically movable relative to one another, so as to change the distance between the valve assembly 12 and the cup 100 or other disposable vessel temporarily located on the vessel-holding structure.

In addition, the vending machine 1 is also provided with an electronic detection device that is adapted to determine, advantageously in real time, the falling time of the soft ice-cream into the cup 100 or other disposable vessel temporarily located beneath the valve assembly 12.

The electronic control device 13, in turn, is electronically-connected to said electronic detection device and is adapted to close the valve assembly 12 of batch-freezing unit 11 based on the signals/data coming from the same electronic detection device.

More in detail, the electronic control device 13 is preferably programmed/configured to close the valve assembly 12 based on the falling time of the soft ice-cream, which was previously calculated/determined by said electronic detection device.

In particular, the electronic detection device of the falling time of the soft ice-cream preferably comprises: a first control member which is adapted to detect and/or communicate when the valve assembly 12 opens to let the soft ice-cream flow out; a second control member which is adapted to detect and/or communicate when the soft ice-cream flowing out of the valve assembly 12 touches the cup 100 or other disposable vessel, or rather the bottom of the cup 100, located still beneath the valve assembly 12; and an electronic processing unit which is electronically connected to the two control members and is programmed/configured to determine/calculate the falling time of the soft ice-cream onto the cup 100 or other disposable vessel based on the data/signals coming from said control members.

Preferably, said electronic processing unit is moreover integrated/incorporated into the electronic control device 13.

With reference to FIGS. 1, 2 and 3, in particular, the vending machine 1 is provided with a detection device 14, which is preferably located on said vessel-holding structure and is adapted to determine when the soft ice-cream flowing out of the valve assembly 12 touches the cup 100 located still beneath the valve assembly 12, or rather the bottom of the cup 100.

The detection device 14 advantageously forms the second control member of the electronic detection device of the falling time of the soft ice-cream.

The electronic control device 13, in turn, is preferably electronically connected to the detection device 14, and is adapted to control the valve assembly 12 of batch-freezing unit 11 based on the signals coming from the detection device 14.

More in detail, the electronic control device 13 is preferably adapted to close the valve assembly 12 based on the signals coming from the detection device 14.

In greater detail, the electronic control device 13 is preferably programmed/configured to calculate or, anyway, determine the falling time of the soft ice-cream onto the cup 100 or other disposable vessel based on the data/signals coming from the detection device 14. In addition, the electronic control device 13 is preferably programmed/configured to close the valve assembly 12 based on the previously-calculated falling time of the soft ice-cream.

In the example shown, therefore the electronic detection device of the falling time of the soft ice-cream preferably comprises the detection device 14 and the electronic control device 13.

Furthermore, the electronic control device 13 is preferably also electrically connected to the control panel 6 and, advantageously, also commands the closing device 5.

With reference to FIGS. 1, 2, 3, and 4, in the example shown, in particular, the vessel-holding structure preferably includes an advantageously electrically-operated, automatic vessel feeder 15 that, on command, is capable of placing a cup 100 or other disposable vessel at a time beneath the valve assembly 12 of batch-freezing unit 11, so that it receives the soft ice-cream that flows out and falls from the valve assembly 12.

Preferably, the automatic vessel feeder 15 is moreover capable of vertically moving the cup 100 or other disposable vessel beneath the valve assembly 12, so as to vary, on command, the distance between the valve assembly 12 and the cup 100 currently located beneath the valve assembly 12.

The electronic control device 13, in turn, is preferably programmed/configured to also command the automatic vessel feeder 15.

Preferably, the detection furthermore located on the automatic feeder container 15.

More in detail, with reference to FIGS. 1 and 2, the vending machine 1 preferably also comprises a vessel store 16 which is located inside the box-like casing 2, advantageously beside the batch-freezing unit 11 and/or the delivery compartment 3, and is capable of accommodating inside itself a plurality of empty cups 100 or other disposable vessels, preferably suitably stacked on top of one another.

The automatic vessel feeder 15, in turn, is preferably structured so as to, on command and in sequence: pick up an empty cup 100 or other disposable vessel from the vessel store 16; place the cup 100 or other disposable vessel beneath the valve assembly 12 of batch-freezing unit 11, so that it can receive the soft ice-cream flowing out and falling from the valve assembly 12; and finally lay down the cup 100 with the soft ice-cream in the delivery compartment 3.

In addition, the vending machine 1 preferably also comprises: a preferably electrically-operated, refrigerator compartment 17 which is arranged inside the box-like casing 2, advantageously spaced apart beneath the batch-freezing unit 11, is adapted to accommodate/contain inside itself one or more big storage containers (not visible in the figures) containing the semi-finished product needed for producing the soft ice-cream, and which is preferably also adapted to continuously maintain said storage container or containers at a given preservation temperature, advantageously ranging between +1° C. and +4° C.; and an electrically-operated feeding line 18, which is adapted to transfer, or rather pump, on command and/or in a gradual manner, the semi-finished product from the storage container or containers present in the refrigerator compartment 17 to the batch-freezing unit 11, and which is preferably also capable of varying, on command, the flowrate of the semi-finished product directed towards the batch-freezing unit 11. Also the feeding line 18 is preferably commanded by the electronic control device 13.

With reference to FIGS. 1, 2 and 3, in particular, the batch-freezing unit 11 preferably comprises: a closed and an oblong-shaped, batch-freezing container 20 which extends parallel to a predetermined longitudinal axis, is arranged inside the box-like casing 2 preferably in a more or less horizontal position and/or spaced apart above the refrigerator compartment 17, and is connected to the feeding line 18 so as to receive the semi-finished product needed for the production of the soft ice-cream; and an electrically-operated cooling assembly 21 that is arranged inside the box-like casing 2 and is structured so as to bring and maintain the batch-freezing container 20 at a given batch-freezing temperature, which is preferably lower than +0° C. and advantageously ranges between −8° C. and −4° C.

More in detail, the batch-freezing container 20 is preferably made of metal material and is preferably substantially cylindrical in shape. The cooling assembly 21, in turn, is preferably a heat pump unit.

The valve assembly 12 of batch-freezing unit 11, on the other hand, comprises: a tapping valve 22, which is preferably located at a first axial end of the batch-freezing container 20 and is adapted to gradually let the soft ice-cream come out of the batch-freezing container 20 through a dispensing nozzle advantageously turned downwards; and a preferably electrically-operated, actuator 23 which is adapted to open and close, on command, the tapping valve 22 and is commanded by the electronic control device 13.

More in detail, the actuator 23 is adapted to move, on command, the movable shutter of tapping valve 22 between a first and a second operating position.

When the movable shutter is in the first operating position, the tapping valve 22 is closed and prevents the soft ice-cream from flowing out of the batch-freezing container 20. Instead, when the movable shutter is in the second operating position, the tapping valve 22 is open and allows the soft ice-cream to flow out of the batch-freezing container 20 with the possible maximum flow rate.

Furthermore, the actuator 23 is preferably a separate and distinct component from tapping valve 22 and is preferably located immediately above the tapping valve 22.

With particular reference to FIG. 3, preferably the valve assembly 12 of vending machine 1 moreover includes a second detection device 24, which is adapted to determine when the tapping valve 22 is in the closed configuration and, optionally, also when the tapping valve 22 is in the opened configuration.

In other words, the detection device 24 is adapted to detect when the movable shutter of tapping valve 22 is in the first operating position and, optionally, also when the movable shutter of tapping valve 22 is in the second operating position.

The detection device 24 advantageously forms the first control member of the electronic detection device of the falling time of the soft ice-cream.

The electronic control device 13, in turn, is preferably electronically connected also to the detection device 24 so as to know, substantially in real time, when the tapping valve 22 opens, namely when the movable shutter of tapping valve 22 moves away from the first operating position.

In addition, the electronic control device 13 is preferably also programmed/configured so as to command, or rather open and close, the valve assembly 12, or rather the tapping valve 22, also based on the signals coming from the detection device 24.

More in detail, the electronic control device 13 is preferably programmed/configured to calculate or, anyway, determine the falling time of the soft ice-cream onto the cup 100 or other disposable vessel based on the data/signals coming from the detection devices 14 and 24.

In the example shown, therefore, the electronic detection device of the falling time of the soft ice-cream preferably comprises the detection device 14, the electronic control device 13 and the detection device 24.

With particular reference to FIG. 3, in the example shown, in particular, the detection device 24 preferably comprises: a first position sensor 25, which is adapted to detect when the tapping valve 22 is in the closed configuration, or rather when the shutter of tapping valve 22 is in the first operating position; and advantageously also a second position sensor 26 which, in turn, is adapted to detect when the tapping valve 22 is in the opened configuration, or rather when the shutter of tapping valve 22 is in the second operating position.

With reference to FIGS. 1, 2 and 3, in addition, the batch-freezing unit 11 preferably also comprises: an oblong mixing member (not visible in the figures) preferably with a substantially helical structure, which is accommodated in axially rotatable manner within the batch-freezing container 20, preferably coaxial to the longitudinal axis thereof; and an electrically-operated motor assembly 27, which is located outside of the batch-freezing container 20, preferably at the second axial end of the batch-freezing container 20, namely on the side opposite the tapping valve 22, and is adapted to drive into rotation the mixing member inside the batch-freezing container 20, so as to thicken the semi-finished product temporarily present inside the batch-freezing container 20 and/or push the soft ice-cream towards the valve assembly 12, or rather towards the tapping valve 22.

With reference to FIGS. 1 to 4, on the other hand, the automatic vessel feeder 15 preferably comprises: a preferably substantially horizontal, movable vessel-holding arm 30 that has the distal end structured so as to receive and hold a cup 100 or other disposable vessel; and an electrically-operated moving assembly 31 that supports and is capable of moving the vessel-holding arm 30 in the area beneath the valve assembly 12, or rather the tapping valve 22.

More in detail, the movable arm 30 preferably extends cantilevered inside the box-like casing 2, preferably in a substantially horizontal direction.

The moving assembly 31, in turn, is preferably adapted to move the vessel-holding arm 30 inside the box-like casing 2, so as to selectively place the distal end of movable arm 30 at the valve assembly 12, or rather at tapping valve 22, at the vessel store 16 and at the delivery compartment 3. Furthermore, the moving assembly is preferably also commanded by the electronic control device 13.

More in detail, the moving assembly 31 is preferably adapted to move the vessel-holding arm 30 to a first operating position, in which the distal end of movable arm 30 is located at the vessel store 16; a second operating position, in which the distal end of movable arm 30 is located at the valve assembly 12, or rather beneath the tapping valve 22; and a third operating position, in which the distal end of movable arm 30 is located in the delivery compartment 3.

Furthermore, the moving assembly 31 is preferably structured so as to be able, on command, to lift and lower the movable arm 30.

More in detail, the moving assembly 31 is preferably structured so as to swing the movable vessel-holding arm 30 about a substantially vertical reference axis A.

In other words, the movable vessel-holding arm 30 preferably lies and swings on a substantially horizontal plane, i.e. substantially perpendicular to axis A.

In addition, the moving assembly 31 is preferably also structured so as to move the movable arm 30 in a substantially vertical direction, i.e. parallel to axis A, preferably always keeping the movable arm 30 parallel to itself.

Furthermore, the delivery compartment 3 is preferably located along the circular path followed by the distal end of movable arm 30, which starts at the vessel store 16 and ends at valve assembly 12.

With reference to FIGS. 1, 2, 3 and 4, in the example shown, in particular, the moving assembly 31 is preferably firmly fixed to the inner framework of box-like casing 2 and preferably comprises: a preferably tubular-shaped, rigid support shaft 32 which extends coaxially to axis A and is fixed to the inner framework of box-like casing 2 with the capability of rotating about axis A and, preferably, also of moving parallel to axis A; an electrically-operated first driving device 33, which is capable of rotating, on command, the support shaft 32 about axis A; and an electrically-operated second driving device 34, which, in turn, is capable of moving the support shaft 32 parallel to axis A, so as to vary the height from the ground of the upper end of the support shaft 32.

The movable arm 30 is preferably firmly fixed to the support shaft 32, or rather to the upper end of support shaft 32, so as to extend cantilevered from the support shaft 32 and move together with the latter.

In addition, the movable arm 30 is preferably provided, on the distal end, with a preferably electrically-operated, clamp holding device 35, which is capable of grabbing and holding, on command, a cup 100 or other disposable vessel. Also the clamp holding device 35 is preferably controlled by the electronic control device 13.

Figure 4:
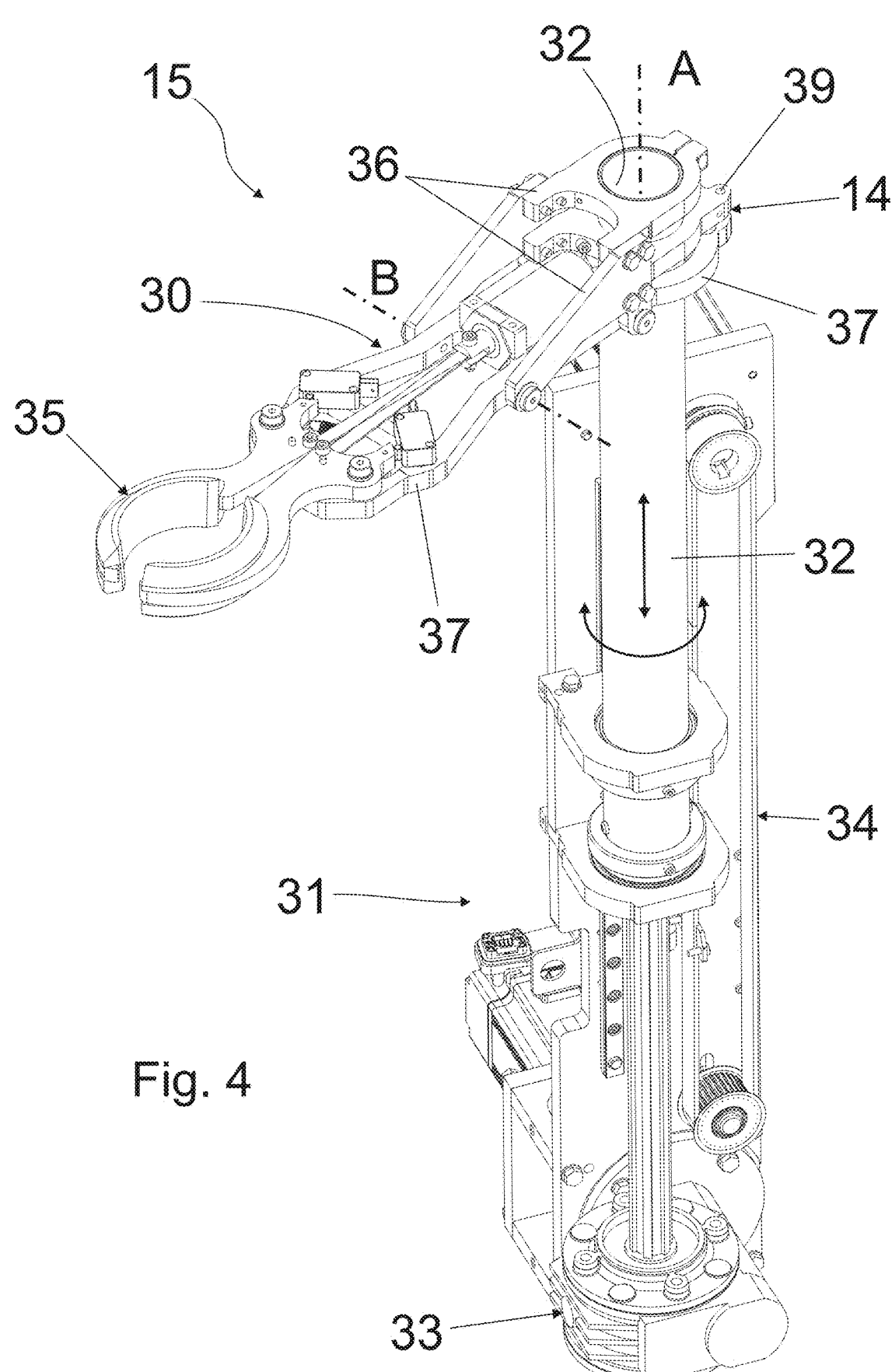

With reference to FIGS. 3 and 4, moreover, the movable arm 30 is preferably provided with a fixed part integral to the support shaft 32, and with an oblong floating part that extends cantilevered from the fixed part and has the distal end structured so as to receive and hold a cup 100 or other disposable vessel. Furthermore, the oblong floating part of movable part 30 is connected to the fixed part so as to slightly move relative to a predetermined reference position, due to an increase in the weight weighing on the same distal end higher than a predetermined minimum value.

Furthermore, the movable arm 30 preferably also includes an elastic countering member (not visible in the figures), which is adapted to elastically hold the oblong gloating part of the arm in said predetermined reference position.

The detection device 14, in turn, is preferably structured so as to detect the movement of the oblong floating part of movable arm 30 from said reference position.

More in detail, the oblong floating part of movable arm 30 is structured so as to slightly lower its distal end because of an excess weight weighing on its own end.

The detection device 14, on the other hand, is preferably structured so as to detect the lowering of the distal end of the oblong floating part of movable arm 30.

In greater detail, with reference to FIGS. 2, 3 and 4, the movable arm 30 preferably comprises: a fixed frame 36, which is rigidly attached to the upper end of support shaft 32; and a rigid and oblong projecting beam 37, which extends cantilevered from the fixed frame 36 preferably in a substantially horizontal direction, and is pivotally joined to the frame 36 so as to freely oscillate/swing by some degrees about a substantially horizontal, transversal axis B.

The distal end of projecting beam 37 is structured so as to receive and hold a cup 100 or other disposable vessel.

In other words, the clamp holding device 35 is preferably located at the distal end of projecting beam 37.

In addition, the movable arm 30 preferably also comprises an elastic member (not visible in the figures), which is adapted to elastically counter the movement/lowering of projecting arm 37 relative to a predetermined reference position, in which projecting beam 37 is preferably substantially horizontal.

More in detail, the elastic member (not visible in the figures) is preferably interposed between the frame 36 and the projecting beam 37 and is preferably structured so as to stably hold the projecting beam 37 in said reference position, as long as the weight weighing on the distal end of projecting beam 37 is smaller than or equal to the one of an empty cup 100 or other disposable vessel.

In other words, the elastic countering member is dimensioned so as to counter-balance the sole weight of the cup 100 or other disposable vessel.

In the example shown, in particular, the beam 37 is preferably pivotally joined to the frame 36 like a rocker arm, so as to freely swing between a lifted position, in which the projecting arm 37 is substantially horizontal, and a lowered position, in which the projecting beam 37 is tilted downwards of a given angle relative to the horizontal swinging plane, preferably equal to 1-3°.

In other words, the projecting beam 37 is preferably pivotally joined like a rocker arm to the frame 36 so as to rotate only by some degrees.

The elastic member, on the other hand, preferably consists of a small helical spring (not visible in the figures), which is preferably interposed between the frame 36 and the projecting beam 37 and is adapted to hold the projecting beam 37 in the lifted position as long as the cup 100 or other disposable vessel present on the distal end of projecting beam 37 is completely empty.

The detection device 14, on the other hand, preferably comprises a position sensor 39 or the like, such as for example a microswitch, which is preferably located on frame 36 and is adapted to determine/signal when the projecting beam 37 moves from the lifted position.

Given the presence of the countering element, the projecting beam 37 moves from the lifted position only when a weight exceeding the one of the empty cup 100 or other disposable vessel weighs on the distal end of projecting beam 37.

With reference to FIGS. 1 and 2, the closing device 5 preferably comprises: a rotary platform 40 advantageously circular in shape, which is located inside the delivery compartment 3 in a substantially horizontal position and with the capability of rotating about a substantially vertical central axis, and is dimensioned so as to be locally substantially tangent to the access opening to the delivery a compartment 3; vertical wall 41 advantageously substantially semi-cylindrical in shape, which is preferably made of transparent material and rises from a portion of the peripheral edge of rotary platform 40 so as surround the area above the rotary platform 40 and so as to obstruct/close the access opening to the delivery compartment 3; and finally an electrically-operated actuator (not visible in the figures), which is capable of rotating, on command, the rotary platform 40 by approximately 180° so as to selectively place the vertical wall 41 in a first and a second operating position.

In the first operating position, the vertical wall 41 is interposed between the rotary platform 40 and the access opening to the delivery compartment 3, so as to prevent the user's hand from reaching the rotary platform 40.

In the second operating position, the vertical wall 41 located behind the rotary platform 40, i.e. on the opposite side of the rotary platform 40 relative to the access opening to the delivery compartment 3, so as to allow the user's hand to reach the rotary platform 40.

After having placed the cup 100 or other disposable vessel at valve assembly 12, or rather beneath tapping valve 22, the automatic vessel feeder 15, or rather the movable vessel-holding arm 30, is hence adapted to lay down/place the cup 100 or other disposable vessel on the rotary platform 40.

The vessel store 16 is a component already used in vending machines for cup drinks and, therefore, will not be described any further.

With reference to FIG. 3, finally the feeding line 18 preferably comprises an electrically-operated volumetric pump 44, and more in detail a peristaltic pump, which is preferably located inside the refrigerator compartment 17 and is adapted to gradually pump the semi-finished product from the storage container/s present in the refrigerator compartment 17 to the batch-freezing unit 11.

General operation of vending machine 1 is easily inferable from the description above and substantially entails:

placing an empty cup 100 or other disposable vessel beneath the valve assembly 12 of batch-freezing unit 11; and then filling the cup 100 or other disposable vessel immediately beneath with the predetermined quantity of soft ice-cream.

In addition, after having filled the cup 100 or other disposable vessel with the predetermined quantity of soft ice-cream, operation of vending machine 1 preferably also entails moving/transferring the cup 100 or other disposable vessel containing to the soft ice-cream to the delivery compartment 3.

Preferably, before placing the empty container 100 or other disposable vessel beneath the valve assembly 12 of batch-freezing unit 11, operation of vending machine 1 additionally comprises the step of retrieving the empty cup 100 or other disposable vessel from the vessel store 16.

More in detail, after the user has selected, via control panel 6, the desired type of soft ice-cream and/or the desired quantity of soft ice-cream among the available ones and has paid the amount due, the electronic control device 13 preferably commands the automatic vessel feeder 15 so as to retrieve an empty cup 100 or other disposable vessel from the vessel store 16, and so as to place said empty cup 100 or other disposable vessel beneath the valve assembly 12, or rather beneath the tapping valve 22.

When the cup 100 or other disposable vessel is stationary beneath the valve assembly 12, or rather beneath the tapping valve 22, the electronic control device 13 opens the valve assembly 12 of batch-freezing unit 11, or rather the tapping valve 22, so as to fill the cup 100 or other disposable vessel with the predetermined and/or desired quantity of soft ice-cream.

In other words, the electronic control device 13 opens the valve assembly 12, or rather the tapping valve 22, for an amount of time that allow the predetermined and/or selected quantity of soft ice-cream to fall into the cup 100 or other disposable vessel stationary beneath the valve assembly 12, or rather beneath the tapping valve 22.

Once the cup 100 has been filled with the predetermined and/or selected amount of soft ice-cream, the electronic control device 13 commands preferably the automatic vessel feeder 15 so as to transfer and lay down the cup 100 containing the soft ice-cream in the delivery compartment 3.

When the cup 100 or other disposable vessel filled with ice-cream reaches the delivery compartment 3, the electronic control device 13 operates the closing device 5 so as to free the access opening to the delivery compartment 3 in order to allow the user's hand to pick up, from the delivery compartment 3, the cup 100 or other disposable vessel with the soft ice-cream.

Figures 5, 6, 7:
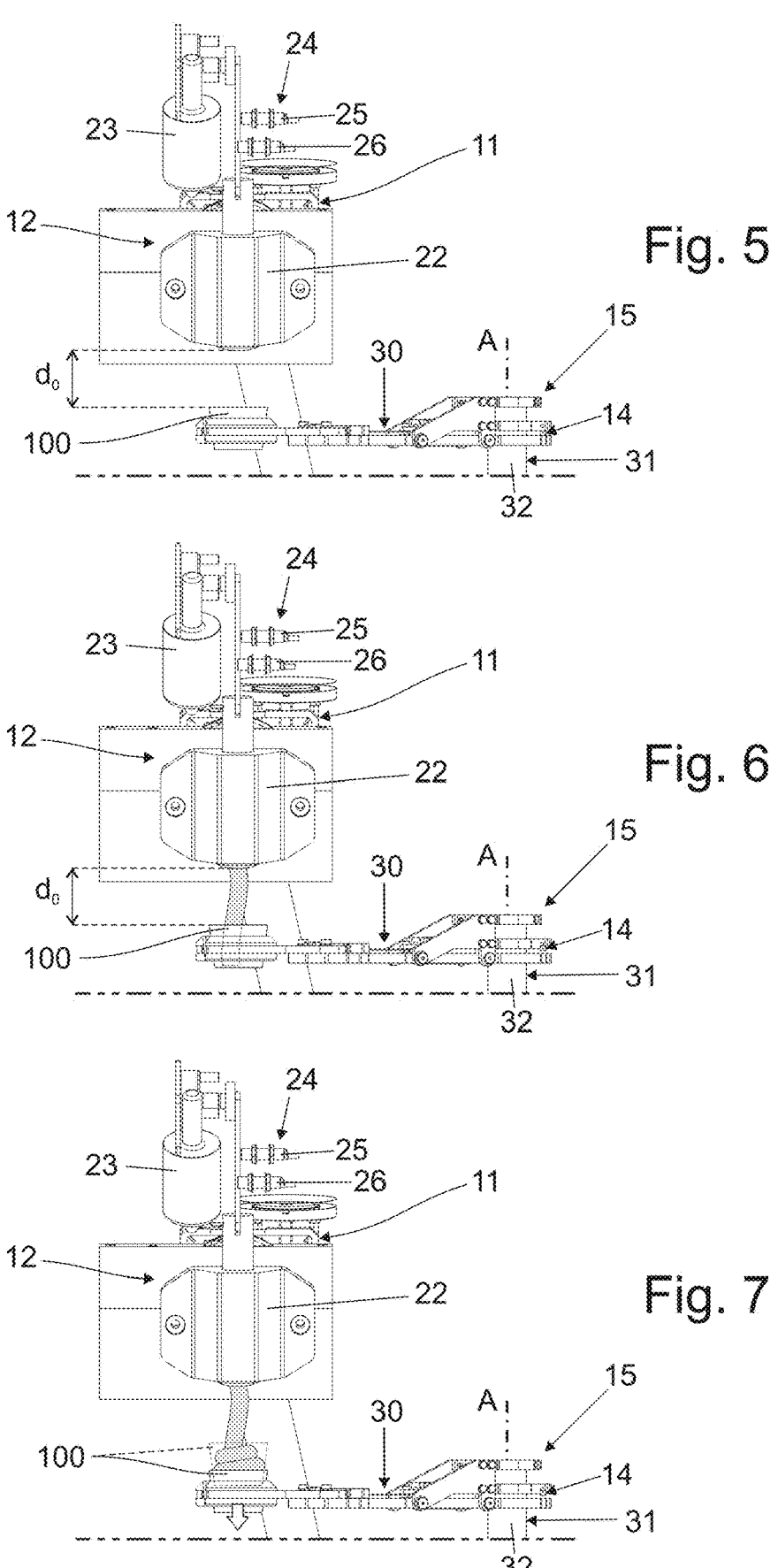
FIGS. 5, 6 and 7 show some steps of the operation of the vending machine shown in the preceding figures.

With reference to FIGS. 5, 6 and 7, in turn, the filling of the cup 100 or other disposable vessel entails:

placing the cup 100 or other disposable vessel beneath the valve assembly 12, or rather beneath the tapping valve 22, at a predetermined distance do from the latter;

opening the valve assembly 12, or rather the tapping valve 22, so as to allow the soft ice-cream to fall into the cup 100 or other disposable vessel immediately beneath;

determining the time needed by the soft ice-cream flowing out of valve assembly 12 to reach the cup 100 or other disposable vessel, i.e. the falling time of the soft ice-cream;

calculating the total opening time of valve assembly 12, or rather the total opening time of tapping valve 22, based on the time needed by the soft ice-cream to reach the cup 100 or other disposable vessel; and finally closing the valve assembly 12, or rather the tapping valve 22, when the previously-calculated total opening time of valve assembly 12 has elapsed.

Therefore, the dosing of the right quantity of soft ice-cream into the cup 100 or other disposable vessel takes place based on the time needed by the front end of the extruded soft ice-cream flowing out of valve assembly 12, or rather of tapping valve 22, to reach the cup 100 or other disposable vessel located beneath the valve assembly 12.

Preferably, operation of vending machine 1 furthermore entails gradually moving the cup 100 or other disposable vessel away from the valve assembly 12, or rather from tapping valve 22, or vice versa, after the soft ice-cream, or rather the end of the extruded soft ice-cream, has touched the cup 100 or other disposable vessel.

In other words, operation of vending machine 1 also comprises moving the cup 100 or other disposable vessel away from the valve assembly 12, or rather from tapping valve 22, while the soft ice-cream accumulates inside the cup 100 or other disposable vessel.

More in detail, the electronic control device 13 preferably commands the automatic vessel feeder 15 so as to place the cup 100 or other disposable vessel beneath the valve assembly 12, or rather beneath tapping valve 22, at a predetermined distance do from the latter.

When the cup 100 or other disposable vessel is stationary beneath the valve assembly 12, at distance do from the latter, the electronic control device 13 opens the valve assembly 12 of batch-freezing unit 11, or rather operates the actuator 23, so as to allow the soft ice-cream to flow out and fall into the cup 100 or other disposable vessel beneath.

The detection device 24 communicates to the electronic control device 13 when the valve assembly 12 of batch-freezing unit 11 opens, or more advantageously the exact moment in which the tapping valve 22 starts to open.

When the detection device 14 signals that the soft ice-cream has reached cup 100, or rather has touched the bottom of cup 100, the electronic control device 13 calculates the time elapsed since the opening of valve assembly 12 and, based on said value, determines the total opening time of valve assembly 12, i.e. the time needed by the predetermined quantity of soft ice-cream to fall into the cup 100.

In other words, the electronic control device 13 calculates the total opening time of the shutter of tapping valve 22 based on the time elapsed since the opening of the valve assembly 12, or rather based on the time needed by the extruded soft ice-cream to reach the cup 100 or other disposable vessel placed beneath the valve assembly 12, or rather beneath tapping valve 22.

The time between the opening of the valve assembly 12, or rather the shifting of the movable shutter of tapping valve 22 from the first operating position, and the arrival of the soft ice-cream on the bottom of cup 100, allows the electronic control device 13 to determine the actual flowing-out speed of the soft ice-cream from batch-freezing unit 11.

Preferably determination of the flowing-out speed of soft ice-cream from batch-freezing unit 11 takes place based on a reference mapping preferably stored in the electronic control device 13.

Whereas the total opening time of valve assembly 12, or rather the total opening time of the shutter of tapping valve 22, is a function of the quantity of soft ice-cream to be dispensed and of the flowing-out speed of the soft ice-cream from the valve assembly 12 of batch-freezing unit 11.

Therefore, the electronic control device 13 determines the opening time of valve assembly 12, or rather the opening time of the shutter of tapping valve 22, based on the signals coming from detection device 14 and preferably also from detection device 24.

Clearly, the electronic control device 13 is programmed/configured so as to close the valve assembly 12, or rather the tapping valve 22, once the previously-calculated total opening time of valve assembly 12 has elapsed.

For example, assuming that a quantity of soft ice-cream of about 80 gr (grams) is to be delivered into the cup 100, the electronic control device 13 commands the automatic vessel feeder 15 so as to place the cup 100 beneath the tapping valve 22, with the bottom of the cup at distance of approximately 5-8 cm (centimetres) from the nozzle of tapping valve 22; and then it opens the tapping valve 22 so as to let the soft ice-cream fall into the cup 100.

Assuming that the detection device 14 detects the contact of the soft ice-cream with the bottom of cup 100, for example, after approximately 1.9 sec (seconds), the electronic control device 13 calculates, based on said value, the total opening time of the tapping valve 22 needed to pour a quantity of soft of ice-cream of about 80 gr (grams) into the cup 100. The calculation takes place based on a reference mapping advantageously stored in the electronic control device 13 and produces, as a result, a total opening time of the tapping valve 22 equal, for example, to about 2.3 sec (seconds).

Once it is known the total opening time of tapping valve 22 needed to pour a quantity of soft of ice-cream of about 80 gr (grams) into the cup 100, the electronic control device 13 waits 2.3 sec (seconds) after the opening of tapping valve 22 and then closes the tapping valve 22 so as to interrupt the outflow of soft ice-cream.

Moreover the electronic control device 13 is preferably programmed/configured so as to gradually increase the distance existing between the cup 100 or other disposable vessel and the valve assembly 12, or rather the tapping valve 22, immediately after the detection device 14 has signalled that the soft ice-cream has touched the bottom of the cup 100.

In other words, the electronic control device 13 commands the automatic vessel feeder 15 so as to gradually lower the cup 100 or other disposable vessel located beneath the valve assembly 12, or rather beneath the tapping valve 22, immediately after the detection device 14 has signalled that the soft ice-cream has touched the bottom of cup 100.

Advantageously the electronic control device 13 is moreover programmed/configured so as to determine/select the moving-away speed, or rather the downward speed of the cup 100, based on the time elapsing between the opening of the valve assembly 12 and the arrival of the soft ice-cream onto the cup 100.

In other words, the electronic control device 13 is preferably programmed/configured so as to determine the moving-away speed, or rather the downward speed of the cup 100, based on the signals coming from detection devices 14 and 24.

Clearly, the operating method described above can be advantageously used to also pour a predetermined quantity of a semi-solid foodstuff product with a creamy consistency into a generic container.

In other words, the method for pouring the semi-solid foodstuff product with a creamy consistency into the container comprises the steps of:

placing the container beneath the valve assembly from which the semi-solid foodstuff product with a creamy consistency flows out, at a predetermined distance from the nozzle from which the foodstuff product flows out;

opening the valve assembly so as to cause the semi-solid foodstuff product with a creamy consistency to fall into the container beneath;

determining the time needed by the semi-solid foodstuff product with a creamy consistency flowing out of the valve assembly to reach the container beneath;

calculating the total opening time of the valve assembly based on the time needed by the semi-solid foodstuff product with a creamy consistency to reach the container beneath; and finally closing the valve assembly when the previously-calculated total opening time of the valve assembly has elapsed.

The vending machine 1, therefore, can be advantageously used to also dispense, in a completely automatic manner, creams and another semi-solid foodstuff products with a creamy consistency.

The advantages resulting from the particular structure of the vending machine 1 and the operating method thereof are remarkable.

Experiments have shown that determining the total opening time of valve assembly 12, or rather of the tapping valve 22, based on the time elapsed between the opening of the valve assembly 12 and the arrival of the soft ice-cream onto the cup 100 allows to dose the soft ice-cream with a precision and reliability that are constant over time.

Furthermore, not being bound by a control of the weight of the soft ice-cream poured into the cup 100 or other disposable vessel, the filling procedure described above minimizes those volumetric differences that are due to variations in the density of the soft ice-cream during the day.

Advantage extremely remarkable from a commercial point of view, because it allows producers to always meet the expectations of the consumers, who notoriously appreciate the volume, rather than the weight of the soft ice-cream present in the cup 100.

Finally, it is clear that changes and variations may be made to the vending machine 1 and the operating method thereof described above without however departing from the scope of the present invention.

For example, the detection device 14 may use a load cell located at the distal end of movable arm 30, preferably at the clamp holding device 35, or alternatively on said vessel-holding shelf.

In addition or alternatively, the detection device 14 may use a laser distance sensor, which is preferably fixed on support shaft 32 and is oriented so as to direct the laser beam towards the bottom of the cup 100 or other disposable vessel temporarily located at the distal end of the movable arm 30.

Furthermore, in a less sophisticated embodiment, the vending machine 1 can lack the detection device 24. In this case, the electronic processing unit of the electronic detection device detecting of the falling time of the soft ice-cream uses the instant in which the electronic control device 13 sends the opening command to the valve assembly 12 as a time reference to determine the time needed by the front end of the extruded soft ice-cream to reach the cup 100 or other disposable vessel under the valve assembly 12.

In other words, in this embodiment, the electronic control device 13 forms also the first control member of the electronic detection device detecting of the falling time of the soft ice-cream.

Finally, in a simplified not-shown embodiment, the vending machine 1 can be structured so as to automatically dose the soft ice-cream into a cup 100 or another similar disposable vessel, which a person autonomously and manually places at the vending machine 1 and then manually removes when the cup 100 has been filled with the predetermined quantity of soft ice-cream.

In other words, in this embodiment the dispensing of soft ice-cream is independent of the payment of an amount of money.

Clearly, in this case, the cup 100 does not necessarily have to be a disposable cup. In other words, the cup 100 may also be made of glass and/or wood and/or metal and can be re-used.

More in detail, in this embodiment of vending machine 1, the dispensing nozzle of tapping valve 22 of valve assembly 12 advantageously projects out of the box-like casing 2. Preferably, the box-like casing 2 furthermore lacks the delivery compartment 3.

The vessel-holding structure, on the other hand, preferably comprises, in place of the automatic vessel feeder 15 and of the vessel store 16, a small vessel-holding shelf or other similar support structure, which projects cantilevered beneath the nozzle of tapping valve 22 and is adapted to receive a cup 100 or other disposable vessel resting on.

In other words, the vessel-holding shelf projects from the box-like casing 2 spaced apart beneath the dispensing nozzle of tapping valve 22.

In this embodiment, therefore the vessel-holding shelf is freely accessible from the outside.

Preferably, the vessel-holding shelf is moreover structured so as to arranged or hold the cup 100 or other disposable vessel in a predetermined position, in which the cup 100 is substantially vertically aligned to and/or centred on the dispensing nozzle of tapping valve 22.

In this embodiment, moreover, the detection device 14 is preferably located on the vessel-holding shelf, so that it can determine when the soft ice-cream flowing out of the valve assembly 12 touches the cup 100, or rather the bottom of cup 100, stationary on the vessel-holding shelf, under the tapping valve 22.

More in detail, the detection device 14 may be structured so as to detect the sudden weight increase due to the soft ice-cream that reaches/touches the bottom of cup 100 or other similar vessel stationary on the vessel-holding shelf.

In greater detail, the detection device 14 can advantageously include a load cell, which is located in the vessel-holding shelf and is capable of detecting the sudden weight increase due to the soft ice-cream that reaches/touches the bottom of the cup 100 or other similar vessel.

Furthermore, the vessel-holding shelf is preferably capable of vertically moving beneath the tapping valve 22 of valve assembly 12, advantageously under the control of the electronic control device 13.

More in detail, the vessel-holding shelf is preferably fixed cantilevered to the outer casing 2 with the capability of vertically moving while remaining parallel to itself. In this embodiment, moreover, the automatic vending machine 1 additionally comprises an electrically-operated moving device, which is adapted to vertically move the vessel-holding shelf from and towards the nozzle of the tapping valve 22 of valve assembly 12, so as to vary, on command, the distance of the cup 100 from the nozzle of tapping valve 22.

The electronic control device 13 is preferably adapted to also control said moving device.

The invention claimed is:

1. A vending machine for ice-cream (1) comprising: a batch-freezing unit (11) that is capable of producing, inside itself, soft ice-cream and is provided with a valve assembly (12) with a controlled opening and closing, through which the soft ice-cream can selectively flow out of the batch-freezing unit (11); a vessel-holding structure, which is adapted to temporarily support a portion vessel (100), arranging said portion vessel (100) immediately beneath the valve assembly (12) so as to collect the soft ice-cream that flows out of, and falls from, the same valve assembly (12); and an electronic control device (13) adapted to control at least said valve assembly (12);

the vending machine for ice-cream (1) further comprising an electronic detection device that includes (i) a first detection device (14) that is configured to determine when the soft ice-cream touches the portion vessel (100), and (ii) a second detection device (24) that is configured to determine whether the valve assembly (12) is in a controlled opening position or a controlled closing position;

wherein the electronic detection device is adapted to calculate falling time for soft ice-cream to travel from the valve assembly (12) to the portion vessel (100) based on signals from the first detection device and the second detection device as to when the soft ice-cream comes out of the valve assembly (12) and when the soft ice-cream touches the portion vessel (100) stationary beneath the same valve assembly (12); and wherein the electronic control device (13) is adapted to command said valve assembly (12) to move between the controlled opening position and the controlled closing position based on the falling time calculation received from said electronic detection device.

2. The vending machine according to claim 1, wherein the electronic detection device includes an electronic processing unit that is in electronic communication with the first detection device and the second detection device and is programmed to calculate the falling time of the soft ice-cream onto the portion vessel based on signals from the first detection device and the second detection device.

3. The vending machine according to claim 1, wherein the electronic control device (13) is programmed/configured so as to close the valve assembly (12) based on the signals coming from said electronic detection device.

4. The vending machine according to claim 1, wherein the first detection device (14) is located on said vessel-holding structure.

5. The vending machine according to claim 1, wherein said vessel-holding structure and said valve assembly (12) are movable relative to one another, in order to vary, on command, the distance between the valve assembly (12) and the portion vessel (100) located on the same vessel-holding structure.

6. The vending machine according to claim 1, wherein the valve assembly (12) comprises: a tapping valve (22) which is adapted to gradually cause the soft ice-cream to flow out of the batch-freezing unit (11) through a dispensing nozzle; and an actuator (23) adapted to open and close, on command, said tapping valve (22).

7. The vending machine according to claim 6, wherein the second detection device (24) is adapted to determine when said tapping valve (22) is in the closed configuration and/or when said tapping valve (22) is in the opened configuration.

8. The vending machine according to claim 1, wherein said vessel-holding structure comprises an automatic vessel feeder (15) which is adapted to place one portion vessel (100) at a time beneath said valve assembly (12), so as to collect the soft ice-cream that flows out of, and falls from, said valve assembly (12).

9. The vending machine according to claim 8, wherein the automatic vessel feeder (15) is provided with a movable vessel-holding arm (30) that has the distal end structured so as to be receive and hold said portion vessel (100), and with a moving assembly (31) that supports and is capable of moving the movable vessel-holding arm (30) in the area beneath the valve assembly (12); said movable vessel-holding arm (30) being provided with a fixed part (36) and with an oblong floating part (37) that extends cantilevered from said fixed part (36), has the distal end structured so as to accommodate and hold said portion vessel (100), and is connected to the fixed part (36) so as to be able to move relative to a predetermined reference position, due to an increase in the weight bearing on the distal end.

10. The vending machine according to claim 9, wherein the movable vessel-holding arm (30) additionally includes an elastic member adapted to elastically maintain the oblong floating part (37) of the movable vessel-holding arm (30) in said predetermined reference position.

11. The vending machine according to claim 9, wherein the moving assembly (31) is structured so as to swing the movable vessel-holding arm (30) about a substantially vertical reference axis (A).

12. The vending machine according to claim 9, wherein the moving assembly (31) is structured so as to raise and lower, on command, the movable vessel-holding arm (30).

13. The vending machine according to claim 9, wherein the first detection device (14) is adapted to detect the movement of the oblong floating part (37) of the movable vessel-holding arm (30) from said reference position.

14. The vending machine according to claim 1, wherein the vessel-holding structure comprises a vessel-holding shelf, which is arranged beneath the valve assembly (12) and is adapted to receive, resting thereon, said portion vessel (100) arranging the same portion vessel immediately beneath the valve assembly (12).

15. The vending machine according to claim 1, wherein the batch-freezing unit (11) comprises: a closed and oblong-shaped batch-freezing container (20) which receives the semi-finished product required for production of the soft ice-cream; and a cooling assembly (21) adapted to bring and maintain the batch-freezing container (20) at a batch-freezing temperature below +0° C.; the valve assembly (12) being located at one end of said batch-freezing container (20).

16. The vending machine according to claim 1, wherein the vending machine additionally includes an outer box-like casing (2), which is adapted to be stably rest on the ground and accommodates, inside itself, at least said batch-freezing unit (11), said vessel-holding structure, said electronic control device (13) and said electronic detection device (4); the outer box-like casing (2) being provided with a delivery compartment (3), which is dimensioned so as to accommodate, inside itself, the portion vessel (100) and is accessible from the outside through an access opening.

17. An operating method for a vending machine for ice-cream (1) which comprises: a batch-freezing unit (11) that is adapted to internally produce the soft ice-cream and is provided with a valve assembly (12) with controlled opening and closing, through which the soft ice-cream can selectively flow out of the batch-freezing unit (11); and a vessel-holding structure, which is adapted to temporarily support a portion vessel (100), arranging said portion vessel (100) beneath the valve assembly (12) so as to collect the soft ice-cream that flows out of, and falls from, the same valve assembly (12);

the operating method for the vending machine comprising the steps of:

placing an empty portion vessel (100) beneath the valve assembly (12); and then filling the portion vessel (100) with a predetermined amount of soft ice-cream;

the operating method for the vending machine (1) being characterized in that the filling of the portion vessel (100) comprises the steps of:

placing the portion vessel (100) beneath the valve assembly (12), at a predetermined distance (do) from the latter;

opening the valve assembly (12) so as to cause the soft ice-cream to fall into the portion vessel (100) beneath;

determining the time taken by the soft ice-cream coming out of the valve assembly (12) to reach the portion vessel (100) beneath;

calculating a total opening time of the valve assembly (12) based on the time taken by the soft ice-cream to reach the portion vessel (100); and in subsequent deliveries of soft ice-cream to a new portion vessel (100), closing the valve assembly (12) when the total opening time of the valve assembly (12) previously calculated has elapsed.

18. The operating method according to claim 17, additionally comprising the step of gradually moving the portion vessel (100) away from the valve assembly (12) or vice versa, after the soft ice-cream has touched the portion vessel (100).

19. A method for pouring a semi-solid foodstuff product of creamy consistency inside a container comprising the steps of:

placing the container beneath a valve assembly from which the semi-solid foodstuff product of creamy consistency flows out, at a predetermined distance from the nozzle from which the foodstuff product flows out;

opening the valve assembly so as to cause the semisolid foodstuff product of creamy consistency to fall into the container beneath;

determining the time taken by the semi-solid foodstuff product of creamy consistency coming out of the valve assembly to reach the container beneath;

calculating a total opening time of the valve assembly based on the time taken for the semi-solid foodstuff product of creamy consistency to reach the container beneath; and in subsequent deliveries of semi-solid foodstuff to a new container, closing the valve assembly when the previously calculated total opening time of the valve assembly has elapsed.

\* \* \* \* \*